United States Patent
Roberts et al.

(10) Patent No.: US 7,345,372 B2
(45) Date of Patent: Mar. 18, 2008

(54) ELECTROMECHANICAL GENERATOR FOR, AND METHOD OF, CONVERTING MECHANICAL VIBRATIONAL ENERGY INTO ELECTRICAL ENERGY

(75) Inventors: Stephen Roberts, Hampshire (GB); Behrooz Chini, Hampshire (GB)

(73) Assignee: Perpetuum Ltd., Southampton (GB)

( * ) Notice: Subject to any disclaimer, the term of this patent is extended or adjusted under 35 U.S.C. 154(b) by 90 days.

(21) Appl. No.: 11/370,475

(22) Filed: Mar. 8, 2006

(65) Prior Publication Data

US 2007/0210580 A1    Sep. 13, 2007

(51) Int. Cl.
*H02P 9/04* (2006.01)
*H02N 1/00* (2006.01)

(52) U.S. Cl. .................. 290/1 R; 290/1 A; 310/309
(58) Field of Classification Search ........... 290/1 R, 290/1 A, 7; 310/309, 365, 308
See application file for complete search history.

(56) References Cited

U.S. PATENT DOCUMENTS

| | | | |
|---|---|---|---|
| 3,596,262 A | | 7/1971 | Rollwitz et al. |
| 4,642,547 A | | 2/1987 | Redlich |
| 4,950,931 A | * | 8/1990 | Goldenberg et al. ......... 310/36 |
| 5,016,055 A | * | 5/1991 | Pietrowski et al. ......... 399/390 |
| 5,023,526 A | * | 6/1991 | Kuwabara et al. .......... 318/116 |
| 5,347,186 A | | 9/1994 | Konotchick |
| 5,510,660 A | * | 4/1996 | Flatau et al. .................. 310/26 |
| 6,232,689 B1 | * | 5/2001 | Fujita et al. ................. 310/103 |
| 6,984,902 B1 | * | 1/2006 | Huang et al. .................. 310/26 |
| 7,112,911 B2 | * | 9/2006 | Tanaka et al. ............... 310/309 |

FOREIGN PATENT DOCUMENTS

WO    2005-089294 A    9/2005

OTHER PUBLICATIONS

PCT Office "International Search Report and Written Opinion under PCT Article 18 and Rules 43 and 44" dated Jul. 3, 2007, issued for priority application, PCT/GB2007/000793.
Rajeevan Amirtharajah et al: "Self-Powered Signal Processing using Vibration-Based Power Generation" IEEE Journal of Solid-State Circuits, vol. 33, No. 5, May 1998, XP011060722; Abstract.

* cited by examiner

*Primary Examiner*—Nicholas Ponomarenko
(74) *Attorney, Agent, or Firm*—Colin P. Cahoon; Carstens & Cahoon, LLP (57) ABSTRACT

An electromechanical generator comprising an electromechanical device for converting mechanical vibrational energy into electrical energy, the electromechanical device having a vibratable mass adapted to resonate with an oscillation amplitude at a frequency and a regulator for regulating the oscillation amplitude to a value not greater than a maximum threshold.

17 Claims, 4 Drawing Sheets

FIG. 5
Resonator amplitude

ELECTROMECHANICAL GENERATOR FOR, AND METHOD OF, CONVERTING MECHANICAL VIBRATIONAL ENERGY INTO ELECTRICAL ENERGY

BACKGROUND TO THE INVENTION

The present invention relates to an electromechanical generator for converting mechanical vibrational energy into electrical energy and to a method of converting mechanical vibrational energy into electrical energy. In particular, the present invention relates to such a device which is a miniature generator capable of converting ambient vibration energy into electrical energy for use, for example, in powering intelligent sensor systems. Such a system can be used in many areas where there is an economical or operational advantage in the elimination of power cables or batteries.

DESCRIPTION OF THE PRIOR ART

There is currently an increasing level of research activity in the area of alternative power sources for micro electrical mechanical systems (MEMS) devices, such devices being described in the art as being used for 'energy harvesting' and as 'parasitic power sources'. Such power sources are currently being investigated for powering wireless sensors.

It is known to use an electromechanical generator for harvesting useful electrical power from ambient vibrations. A typical magnet-coil generator consists of a spring-mass combination attached to a magnet or coil in such a manner that when the system vibrates, a coil cuts through the flux formed by a magnetic core. The mass which is moved when vibrated is mounted on a cantilever beam. The beam can either be connected to the magnetic core, with the coil fixed relative to an enclosure for the device, or vice versa.

In a paper entitled "Architecture for vibration-driven micropower generators", by Mitcheson et al, published in the Journal of Micromechanical Systems, Vol. 13, No. 3, June 2004, pp. 335-342, various electromechanical generators are disclosed. In particular, a velocity-damped resonant generator (VDRG) is disclosed which consists of a damper for extracting energy from a mass-spring system. Such a damper may consist, for example, of a magnet-coil generator, such as the combination of two magnets mounted on a keeper to form a C-shaped core with a coil placed in the air-gap between the magnets at right angles to the direction of movement of the mass on a cantilever beam.

The authors identify a damping factor for determining the maximum power obtainable from the velocity-damped resonant generator. In particular, the authors provide a calculation for the optimal damping factor at which maximum power is obtained. The optimal damping factor is calculated using the resonant frequency of the velocity-damped resonant generator.

While this prior disclosure produced a useful mechanism for designing a theoretical electromechanical generator, when an electromechanical generator is used in a practical application, it is not possible accurately to predict the resonant frequency or the optimal damping factor. The electromechanical generator is designed and set up for what is believed to be the likely operating conditions. However, there is no guarantee that the practical operating conditions correspond to the theoretical ideal used to set up the electromechanical generator for the specific application. In practice, an electromechanical generator is set up to be operable across a narrow range of likely operating conditions, in particular with the damping factor being set up so that the power output is within a range encompassing the optimal power output. However, it is very unlikely that the actual power output is optimised for the specific application. Consequently, the electromechanical generator would not operate at maximum efficiency of the conversion of mechanical vibration energy into electrical energy, and thereby into useful electrical power.

Also, the frequency of ambient vibration may change during operation. The known electromechanical generator may not be able to operate at maximum efficiency as a result of such a change.

Yet further, the damper of the electromechanical generator incorporates a sprung mass that oscillates about a central position at a frequency intended to correspond to the resonant frequency to which the device is to be subjected in use. The amplitude of the resonant vibration depends upon a number of variables, in particular the frequency and magnitude of the driving vibration, the Q-factor of the resonator, the resonator mass and its resonant frequency.

These variables are not all predictable from the actual conditions encountered when the electromechanical generator is put into use in the field to harvest energy from a vibrating body. The amplitude of vibration of the sprung mass may vary with time, in an intermittent and unpredictable manner.

In particular, the electromechanical generator may, in use, be subjected to a vibration that causes the sprung mass to oscillate with excessively large amplitude (hereinafter referred to as an "unsafe" amplitude) with the result that the mass may physically impact upon the device's outer casing at the limits of its travel. Alternatively if there is no casing, then the mass may oscillate with an excessively large amplitude that causes permanent damage or degradation to the spring by exceeding the yield stress of the spring material. In either case, it may be expected that this impacting or yielding would reduce the operating lifetime of the electromechanical generator to an unacceptable degree.

In the case that the device has an outer casing that is being impacted, it may be possible to use a compliant material as a buffer between the surfaces that may mutually contact or impact. However, such a "mechanical stop" would be subject to wear and would not completely eliminate the extra stress to which the spring would be subjected on impact.

Resonant vibration energy harvesters are advantageously designed such that their Q-factor is as high as possible. This is because higher powers can be generated with higher-Q resonators. However if such a device is situated in an environment where the driving vibration becomes higher in magnitude than expected, then the amplitude of the resonator may become larger than the that designed or accommodated for. This amplitude may cause the resonating mass to impact on the device casing and potentially lead to permanent device damage after prolonged exposure.

SUMMARY OF THE INVENTION

Accordingly, there is a need to provide an electromechanical generator that accommodates the possibility that the amplitude of vibration of the sprung mass may vary with time, in an intermittent and unpredictable manner, and can accordingly have a reduced possibility of damage from unsafe amplitudes, and thereby an enhanced operating lifetime.

The present invention aims to provide an improved electromechanical generator for converting mechanical vibrational energy into electrical energy which can meet this need.

The present invention also aims to provide an improved electromechanical generator for converting mechanical vibrational energy into electrical energy which is adapted to prevent the amplitude of the resonator from rising above a certain threshold.

The present invention also aims to provide an improved electromechanical generator for converting mechanical vibrational energy into electrical energy which is adapted to reduce the amplitude of the resonator when the amplitude rises above a certain threshold.

The present invention also aims to provide an improved electromechanical generator for converting mechanical vibrational energy into electrical energy which includes a limiter for the vibration amplitude that does not cause any power loss from the generator below a particular or predetermined amplitude threshold, thereby avoiding or minimizing any reduction in the energy conversion efficiency of the electromechanical generator when the electromechanical generator is operating in a particular or predetermined amplitude operating range which is less than or not greater than the particular or predetermined amplitude threshold.

The present invention accordingly provides an electromechanical generator comprising an electromechanical device for converting mechanical vibrational energy into electrical energy, the electromechanical device having a vibratable mass adapted to resonate with an oscillation amplitude at a frequency and a regulator for regulating the oscillation amplitude to a value not greater than a maximum threshold.

Preferably, in accordance with one preferred aspect, the regulator comprises at least one voltage regulator for an output voltage of the electromechanical device, the at least one voltage regulator being adapted to cause short circuiting of an output of the electromechanical device when the output voltage exceeds a threshold voltage.

More preferably, the voltage regulator comprises at least one Zener diode.

In one preferred embodiment, the regulator comprises two voltage regulators connected across an alternating current electrical output of the electromechanical device, the two voltage regulators each having a predetermined breakdown voltage and being connected in series and in an opposite current configuration across the electrical output.

In another preferred embodiment, the regulator comprises a voltage regulator connected across a direct current electrical output of the electromechanical device, the voltage regulator having a predetermined breakdown voltage.

In a further preferred embodiment, the regulator comprises two first voltage regulators connected across an alternating current electrical output of the electromechanical device, the two voltage regulators each having a predetermined breakdown voltage and being connected in series and in an opposite current configuration across the electrical output, a rectifier connected to the voltage regulators, and a second voltage regulator connected across a direct current electrical output of the rectifier, the second voltage regulator having a predetermined breakdown voltage.

In a yet further preferred embodiment, the regulator comprises a rectifier connected across an alternating current electrical output of the electromechanical device, the rectifier incorporating a plurality of voltage regulators each having a predetermined breakdown voltage.

Preferably, in accordance with another preferred aspect, the electromechanical generator further comprises a detector for detecting the oscillation amplitude, and a comparator for determining whether the detected oscillation amplitude is above a predetermined maximum threshold, and the regulator is operable in response to the comparator.

Preferably, the detector is adapted to detect an electrical output from the electromechanical device, and the comparator is adapted to compare the detected electrical output to a threshold value of electrical output corresponding to the predetermined maximum amplitude.

In one embodiment, the detector is adapted to detect an alternating current and an alternating voltage outputted from the electromechanical device.

Preferably, the comparator is adapted to calculate a value of the electromotive force generated by the electromechanical device, and to compare that value with a preset value of electromotive force.

In another embodiment, the electromechanical generator further comprises a rectifier for rectifying the electrical output of the electromechanical device, and the detector is adapted to detect a direct current and a direct voltage outputted from the rectifier.

Preferably, the electromechanical generator further comprises a shunt impedance element, having variable impedance, connected across output terminals of the electromechanical device and the regulator is adapted to adjust the impedance of the shunt impedance element thereby to regulate the oscillation amplitude.

More preferably, the impedance of the shunt impedance element is relatively high when the oscillation amplitude is not greater than the predetermined maximum threshold, and the impedance of the shunt impedance element is relatively low when the oscillation amplitude is above the predetermined maximum threshold.

In alternative embodiments, the detector is selected from one of an optical proximity device; a magnetic proximity device; a mechanical proximity device; a piezoelectric device; an electromagnetic induction device; or a magnetostrictive device.

Preferably, the regulator is adapted to provide a dynamic feedback control of the amplitude in response to the detected amplitude.

More preferably, the dynamic feedback control is continuous or intermittent.

The present invention also provides a method of converting mechanical vibrational energy into electrical energy using an electromechanical generator, the method comprising the steps of:

(a) providing an electromechanical generator comprising an electromechanical device for converting mechanical vibrational energy into electrical energy at an electrical output of the electromechanical device, the electromechanical device having a vibratable mass adapted to resonate with an oscillation amplitude at a resonant frequency;

(b) vibrating the electromechanical device thereby to vibrate the vibratable mass thereby to generate an output voltage at the electrical output; and (c) controlling the output voltage to below a predetermined maximum threshold value by short circuiting the electrical output when the output voltage is above the predetermined maximum threshold thereby to regulate the oscillation amplitude to a value not greater than a predetermined maximum threshold value.

The present invention further provides an electromechanical generator comprising an electromechanical device for converting mechanical vibrational energy into electrical energy, the electromechanical device having a vibratable mass adapted to resonate with an oscillation amplitude at a frequency, an electrical output for the electrical energy, and at least one voltage regulator for regulating an output voltage at the electrical output, the at least one voltage regulator being connected across the electrical output and being adapted to short circuit the electrical output of the electromechanical device when the output voltage exceeds a threshold voltage thereby to cause damping of the vibration of the vibratable mass.

The present invention also provides an electromechanical generator comprising an electromechanical device for converting mechanical vibrational energy into electrical energy, the electromechanical device having a vibratable mass adapted to resonate with an oscillation amplitude at a frequency, the vibratable mass comprising a first element selected from the group consisting of at least one coil and at least one magnet, and the vibratable mass being arranged to vibrate relative to a second element of the electromechanical device selected from the group consisting of at least one magnet and at least one coil, respectively; a detector for detecting an electrical output from the at least one coil of the electromechanical device; a comparator for calculating a value of the electromotive force generated by the at least one coil of the electromechanical device, and to compare that value with a preset value of electromotive force; a shunt impedance element, having variable impedance, connected across output terminals of the electromechanical device; and a regulator, operable in response to the comparator, which is adapted to adjust the impedance of the shunt impedance element thereby to regulate the calculated value of the electromotive force to a value not greater than the preset value of electromotive force.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

Figure 1:
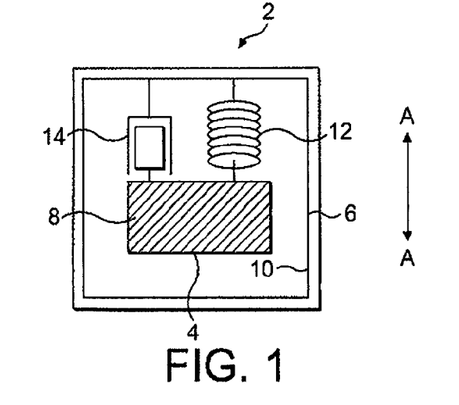
FIG. 1 is a schematic side elevation of an electromechanical device for converting mechanical vibrational energy into electrical energy for use in an electromechanical generator in accordance with an embodiment of the present invention.

FIG. 1 shows an electromechanical device 2 for converting mechanical vibrational energy into electrical energy for use in accordance with an embodiment of the present invention. The electromechanical device 2 uses a resonant mass-spring arrangement 4 mounted within an enclosure 6. The resonant mass-spring arrangement 4 comprises an inertial mass 8 mounted to an internal wall 10 of the enclosure 6 by a spring 12 and a damper 14, the spring 12 and damper 14 being in a parallel configuration.

If the enclosure 6 is subject to a source of external vibration that causes it to move along the direction A-A, then the inertial mass 8 may move relative to the enclosure 6, also along the direction A-A. In doing so, the length of the spring 12 is changed, either being compressed or extended, and work is done against the damper 14.

In FIG. 1, for simplicity the damper 14 is shown schematically as a piston and cylinder arrangement. However, as known to persons skilled in the art, the damper 14 comprises an assembly capable of generating an electrical current when the two parts thereof are subjected to relative movement. The mechanical power may be converted to electrical power via an electromagnetic coupling and/or via a piezoelectric coupling. Typically, the "piston" which as arranged to be translationally movable comprises an electrical coil and the "cylinder" which is arranged to be static comprises a magnetic assembly that generates a region of magnetic flux within which the electrical coil is disposed. However, an opposite configuration may be employed. Movement of the electrical coil within the magnetic flux causes an electrical current to be induced in the electrical coil which can be used as a source of electrical power for driving an external device (not shown).

The present invention preferably utilizes electromechanical devices which are resonant generators known in the art as "velocity-damped" where all of the work done by the movement of the inertial mass 8 relative to the enclosure 6 is proportional to the instantaneous velocity of that movement. Inevitably, a portion of that work is absorbed overcoming unwanted mechanical or electrical losses, but the remainder of the work may be used to generate an electrical current via a suitable transduction mechanism, such as the electrical coil/magnetic assembly described above.

Velocity-damped resonant generators have a well known characteristic response when excited by mechanical vibration in the direction A-A. The amplitude, $Z_0$, of the relative motion of the mass, m, with respect to the enclosure is a function of the angular frequency, f, and the amplitude, $Y_0$, of a sinusoidal vibratory motion; and the spring constant k, and damping coefficient c:

$$Z_0 = \frac{f^2}{\sqrt{\left(\frac{k}{m} - f^2\right)^2 + \left(\frac{cf}{m}\right)^2}} Y_0 \qquad (1)$$

The dynamic optimization of the mass-spring and transduction mechanisms to control the maximum amplitude to which the mass is subjected, and thereby to limit the maximum amplitude so as to be below a maximum threshold amplitude, corresponding to a "safe" amplitude, is one purpose of the present invention.

For a typical electromechanical generator having a magnet mounted on a cantilever beam between a static electrical coil, the vibration amplitude ($Z_0$) is typically about 1 mm.

Figure 2:
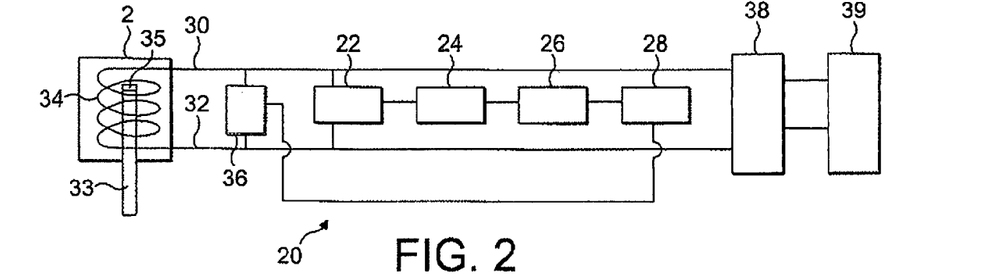
FIG. 2 is a schematic block diagram of an electromechanical generator in accordance with a first embodiment of the present invention, which incorporates the electromechanical device of FIG. 1.

FIG. 2 is a schematic block diagram of an electromechanical generator 20 in accordance with a first embodiment of the present invention.

The electromechanical generator 20 comprises the electromechanical device 2 for converting mechanical vibrational energy into electrical energy as described above with reference to FIG. 1. A detector 22 is connected to the electrical output of the electromechanical device 2, in this embodiment comprising the terminals 30, 32 of at least one coil 34, the coil 34 mounted relative to a cantilever beam 33 carrying at least one magnet 35. The detector 22 is adapted to detect the output voltage ($V_{out}$) and the output current ($I_{out}$) produced by the electromechanical device 2. An EMF calculator 24 is connected to the detector 22 and is adapted to calculate a quantity representing the output EMF of the transduction element according to the following expression:

$$EMF = V_{out} + (I_{out} * R_{trans})$$

where $R_{trans}$ is the internal impedance of the transduction element (e.g. the coil) of the energy harvesting electromechanical device 2.

The EMF is the voltage generated by electromagnetic induction and is directly proportional to the oscillation amplitude.

A signal representing the calculated EMF value is sent from the EMF calculator 24 to a comparator 26 connected thereto. The comparator 26 compares the calculated EMF value to a preset EMF value, and thereby determines whether or not the amplitude of vibration is below a predetermined maximum threshold. The output of the comparator 26 is connected to a regulator 28.

The regulator 28 is adapted to provide controllably variable shunt impedance 36 across the terminals 30, 32 of the coil 34. If the amplitude is determined to be "safe", the shunt impedance is set to be high, for example at least 1 M ohm. In contrast, if the amplitude is determined to be "unsafe", the shunt impedance is reduced, until the amplitude returns to a safe level. The reduced shunt impedance permits more current to flow through the coil, thereby causing a greater force opposing the motion and hence increasing the damping of the oscillation. This in turn leads to a reduction of the amplitude of the resonant vibration until the amplitude is below the predetermined maximum threshold. The oscillation amplitude, represented by the EMF, is therefore detected and dynamically regulated to a threshold value that is pre-determined and designed to be "safe".

This control operation provides a dynamic feedback control of the amplitude is response to the amplitude that is indirectly detected by a determination of the electrical output of the electromechanical device. The dynamic feedback control may be carried out continuously or intermittently during the energy harvesting operation.

The regulator 28 is connected to an AC/DC rectifier 38 which in turn is connected to the load 39.

Figure 3:
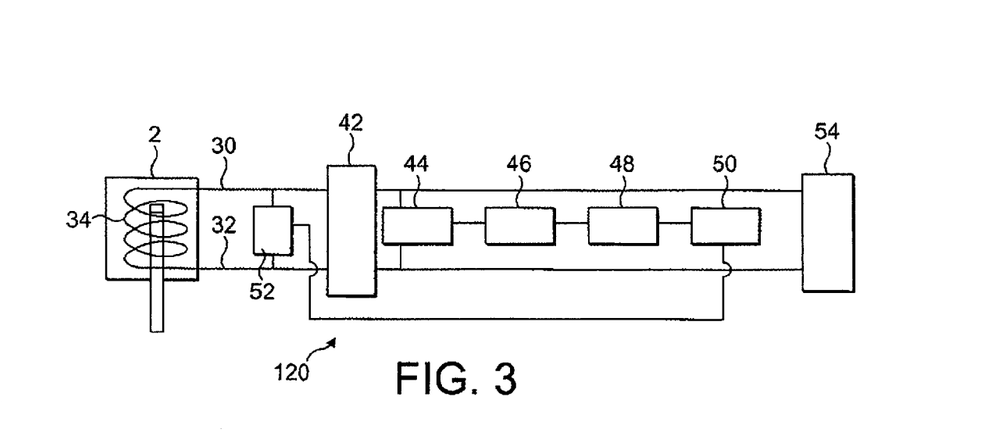
FIG. 3 is a schematic block diagram of an electromechanical generator in accordance with a second embodiment of the present invention, which incorporates the electromechanical device of FIG. 1.

FIG. 3 is a schematic block diagram of an electromechanical generator 120 in accordance with a second embodiment of the present invention.

The second embodiment is modified as compared to the first embodiment by detecting rectified DC voltage and current from the AC/DC rectifier which is connected to the electrical output of the electromechanical device 2, in this embodiment the output terminals of the coil. Accordingly, in the second embodiment the electromechanical generator 120 comprises the electromechanical device 2 for converting mechanical vibrational energy into electrical energy as described above with reference to FIG. 1. An AC/DC rectifier 42 is connected to the output terminals 30, 32 of the coil 34. A detector 44 is connected to the electrical output of the rectifier 42 and is adapted to detect the output DC voltage and the output DC current produced by the rectifier 42. An EMF calculator 46 is connected to the detector 44 and is adapted to calculate a quantity representing the coil EMF, in a manner similar to the first embodiment.

A signal representing the calculated EMF value is sent from the EMF calculator 46 to a comparator 48 connected thereto. The comparator 48 compares the calculated EMF value to a preset EMF value, and thereby determines whether or not the amplitude of vibration is below a predetermined maximum threshold. The output of the comparator 48 is connected to a regulator 50.

The regulator 50 is adapted to provide controllably variable shunt impedance 52 across the terminals 30, 32 of the coil 34 in the manner as described above with respect to the first embodiment.

The DC output from the rectifier 42 is sent to a load 54.

The first and second embodiments provide a dynamic control of the amplitude of vibration below a preset threshold which utilizes the existing power extraction mechanism of the electromechanical generator to detect amplitude. Therefore the first and second embodiments do not require any additional amplitude detection apparatus, apart from the additional sensing and control circuitry. In each embodiment, power sensing circuitry is provided which connects to amplitude regulating circuitry. The sensing circuitry provides the control input for the regulation circuitry in each embodiment.

However, alternative embodiments of the invention may be provided with such an additional amplitude detection apparatus that is mounted to detect motion of the oscillating mass and monitored in such a way that a signal is issued when the "unsafe" amplitude is reached, for example: an optical proximity device; a magnetic proximity device; a mechanical proximity device; a piezoelectric device; an electromagnetic induction device; or a magnetostrictive device.

Figure 4:
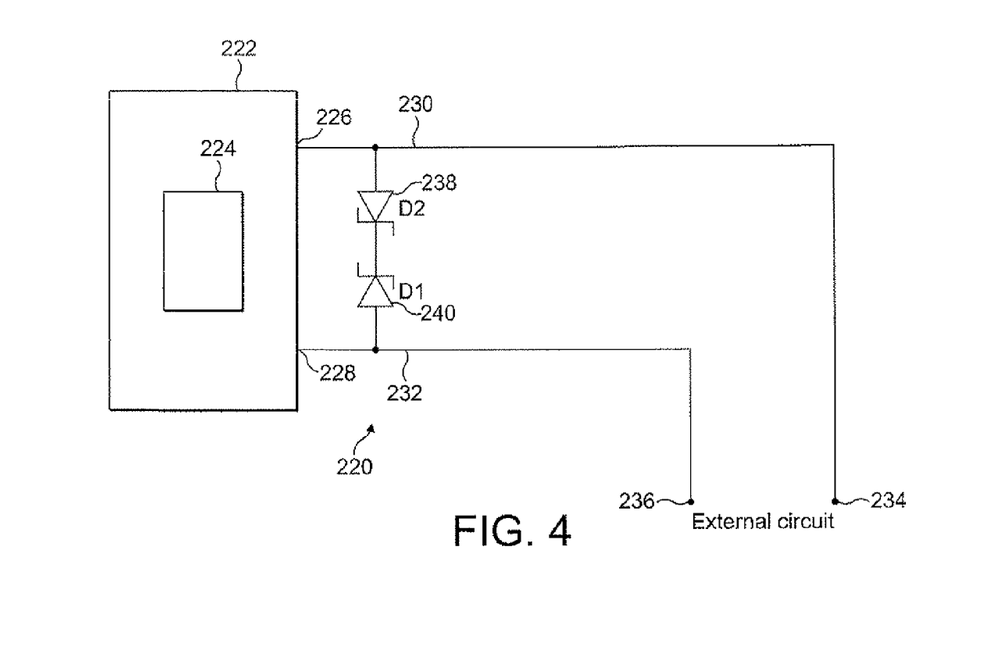
FIG. 4 is a schematic diagram of an electromechanical generator in accordance with a third embodiment of the present invention.

A third embodiment of an electromechanical generator in accordance with the present invention is shown in FIG. 4. The electromechanical generator 220 comprises an electromechanical device 222 having a mass-spring arrangement 224 in the form, for example, of the mass-spring arrangements of any of FIGS. 1 to 3 in which a vibratable mass is adapted to resonate with an oscillation amplitude at a natural frequency. The electromechanical device 222 has an electrical output, which in this embodiment is comprised of two output terminals 226, 228, each having a respective electrical lead 230, 232 connected thereto. In use, the electrical lead 230, 232 are connected by respective connectors 234, 236 to an external electrical circuit to be electrically driven by the electromechanical generator 220.

Two voltage regulators 238, 240 are connected in parallel across the electrical leads 230, 232. Each voltage regulator 238, 240 is adapted to permit current flow therethrough, at a low impedance, in a respective first, forward, direction of current flow and to prevent current flow therethrough, due to high impedance, in a respective second, reverse, direction of current flow when the voltage is below a particular or predetermined breakdown voltage. The two voltage regulators 238, 240 are serially connected across the electrical leads 230, 232 in opposite directions with respect to their respective forward and reverse directions. For example, for the voltage regulator 238, the forward direction of current flow is from lead 230 to lead 232 and the reverse direction of current flow is from lead 232 to lead 230, whereas for the voltage regulator 240, the reverse direction of current flow is from lead 230 to lead 232 and the forward direction of current flow is from lead 232 to lead 230.

Most preferably, each voltage regulator 238, 240 comprises a Zener diode, the two Zener diodes 238, 240 being serially connected in opposite forward and reverse directions, with the breakdown voltage for each Zener diode corresponding to the respective Zener voltage for the Zener diode. With this configuration of the two Zener diodes 238, 240, the electrical output at the connectors 234, 236 is an alternating current (AC).

The breakdown voltage of each voltage regulator 238, 240 is predetermined to provide a short circuit of the electrical output of the electromechanical generator 220 when the output voltage at the two output terminals 226, 228 exceeds a particular threshold, corresponding to the breakdown voltage, which corresponds to a predetermined maximum amplitude for the vibrating mass.

As an example, an electromechanical generator was simulated mathematically, and had the following design parameters shown in Table 1.

TABLE 1

| Parameter | Symbol | Value |
|---|---|---|
| Mass | M | 100 g |
| Q-factor | Q | 300 |
| Coil Resistance | $R_C$ | 10 kΩ |
| Electromagnetic coupling coefficient | κ | 2.0 kg/s |
| Resonator natural frequency | $\omega_n$ | 120 Hz |

Figure 5:
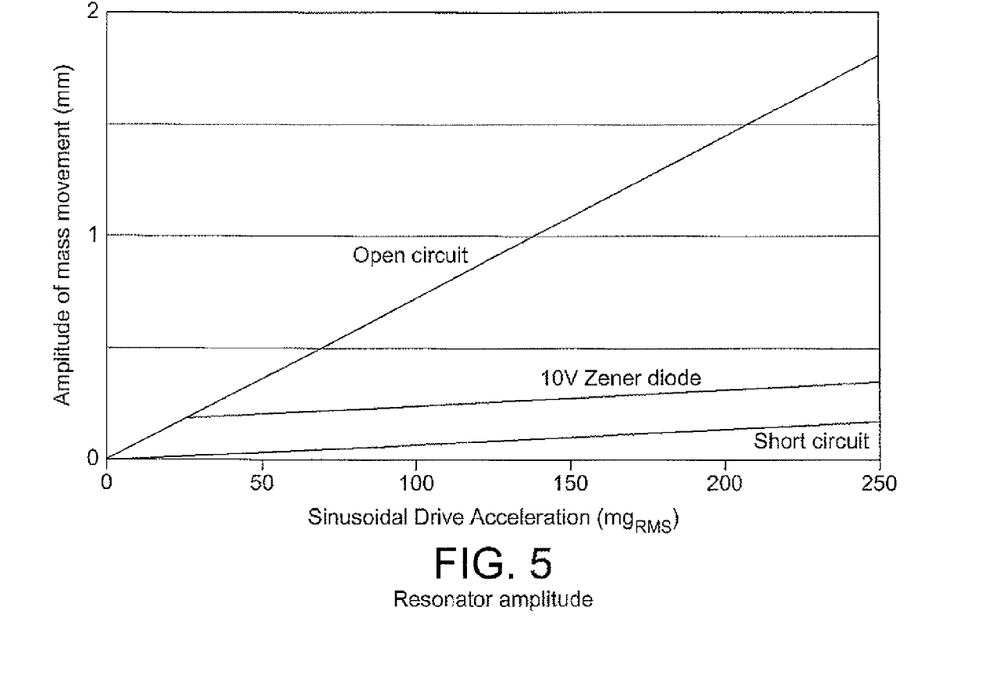
FIG. 5 is a graph showing the relationship between amplitude and sinusoidal drive acceleration for the electromechanical generator in accordance with the third embodiment of the present invention.

Using these parameters, it is possible to calculate how the simulated amplitude of mass movement (expressed in mm) varies with respect to sinusoidal drive acceleration (expressed in $mg_{RMS}$). This variation is dependent upon the output circuitry, in particular whether there is (a) an open circuit between the two output terminals 226, 228; (b) a circuit between two output terminals 226, 228 through two Zener diodes 238, 240; or (c) a short circuit between the two output terminals 226, 228. FIG. 5 depicts a simulation of the electromechanical generator used as an electromagnetic vibration energy harvester being driven by sinusoidal vibration of magnitude a at the natural frequency under these three situations, in which in the latter situation the Zener diodes 238, 240 each have a Zener voltage of 10 volts.

Under open circuit conditions, i.e. absent the voltage regulators in accordance with this aspect of the invention, as the sinusoidal drive acceleration increases, the amplitude correspondingly increases in a linear fashion. This means that the amplitude can become so large that at a sinusoidal drive acceleration of 250 $mg_{RMS}$, the amplitude of movement of the mass is as high as ±1.8 mm. This could cause mechanical damage to the electromechanical generator. Also, the output voltage would correspondingly increase to a high value, which could constitute a potential hazard if the electromechanical generator is used in environments where there is potential explosion risk, for example due to fine powders or combustible gases.

In contrast, in accordance with the present invention, when the circuit between the two output terminals 226, 228 includes the two Zener diodes 238, 240, comprising voltage regulators in accordance with this aspect of the invention, as the sinusoidal drive acceleration increases, the amplitude is limited to substantially a maximum value. In particular, as the sinusoidal drive acceleration increases from zero up to a particular value (X in FIG. 1, corresponding to about 25 $mg_{RMS}$ in the example) the amplitude increases linearly up to a threshold value (A in FIG. 1). Under these conditions the output voltage is just below the breakdown (Zener) voltage, which is 10V, of the Zener diodes. If the sinusoidal drive acceleration increases further above the value X, the breakdown voltage equals or exceeds the Zener voltage. The Zener diodes conduct electrical current in their respective reverse directions. This causes electrical shorting between the output terminals, and damping of the vibration that substantially restricts both the output voltage and the amplitude from increasing further. At a sinusoidal drive acceleration of 250 $mg_{RMS}$, the amplitude of movement of the mass is only ±0.35 mm. This amplitude is significantly lower than under open circuit conditions. The limiting of the amplitude can avoid mechanical damage to the electromechanical generator, by limiting the amplitude to a particular or predetermined maximum value. Also, the output voltage would correspondingly be limited to a value corresponding to the Zener voltage. This significantly reduces the electromechanical generator constituting a potential hazard if the electromechanical generator is used in environments where there is potential explosion risk, for example due to fine powders or combustible gases.

As a comparison, under short circuit conditions, i.e. absent the voltage regulators in accordance with this aspect of the invention and with the two output terminals 226, 228 being electrically connected together, as the sinusoidal drive acceleration increases, the amplitude correspondingly increases in a linear fashion, but the amplitude is very low as a result of the damping caused by the short circuit at all amplitudes of vibration. The amplitude is only ±0.17 mm of movement at 250 $mg_{RMS}$.

Figure 6:
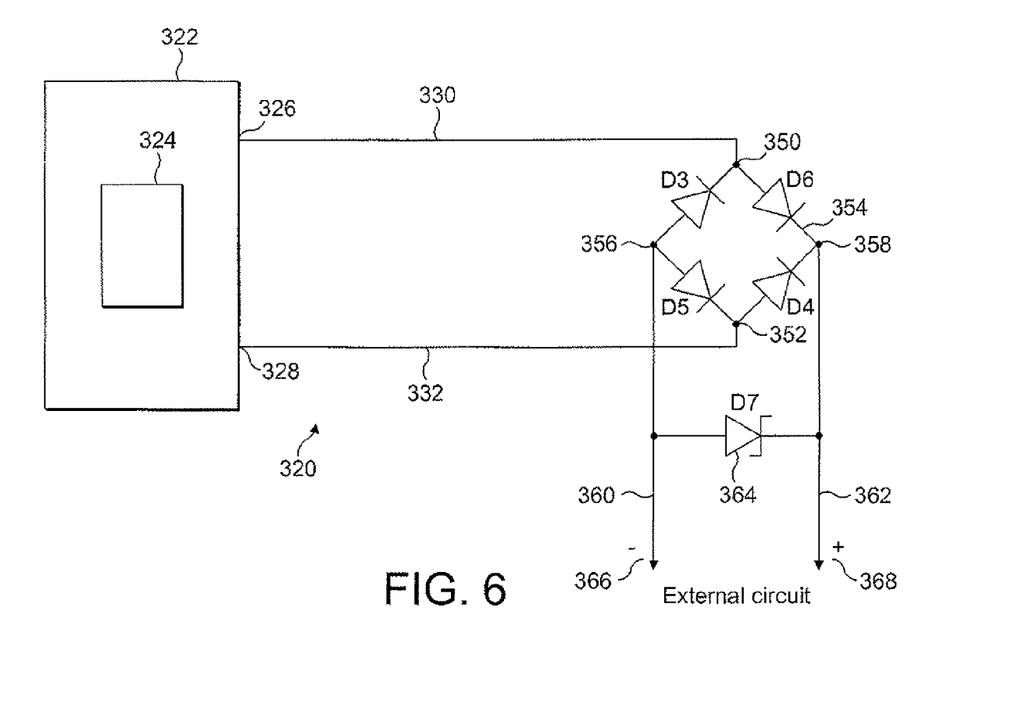
FIG. 6 is a schematic diagram of an electromechanical generator in accordance with a fourth embodiment of the present invention.

A fourth embodiment of an electromechanical generator 320 in accordance with the present invention is shown in FIG. 6. This is a modification of the embodiment of FIG. 3, incorporating a rectifier to produce a DC current output and in which a voltage regulator is between the rectifier and connectors to an external electrical circuit to be electrically driven by the electromechanical generator.

The electromechanical generator 320 comprises an electromechanical device 322 having a mass-spring arrangement 324 in the form, for example, of the mass-spring arrangements of any of FIGS. 1 to 3 in which a vibratable mass is adapted to resonate with an oscillation amplitude at a natural frequency. The electromechanical device 322 has an electrical output, which is comprised of two output terminals 326, 328, each having a respective electrical lead 330, 332 connected thereto. The electrical leads 330, 332 are connected to respective input terminals 350, 352 of an AC-DC rectifier 354 comprising, in known manner, a cyclic series of four diodes. The output terminals 356, 358 of the AC-DC rectifier 354 have output leads 360, 362. A voltage regulator 364 in the form of a Zener diode is connected across the output leads 360, 362. In use, the output leads 360, 362 are connected by respective connectors 366, 368 to an external electrical circuit to be electrically driven by the electromechanical generator 320. When the output DC voltage from the rectifier exceeds the breakdown voltage of the voltage regulator, the output leads are short circuited, causing a limiting of the vibration amplitude of the electromechanical generator 320.

Figure 7:
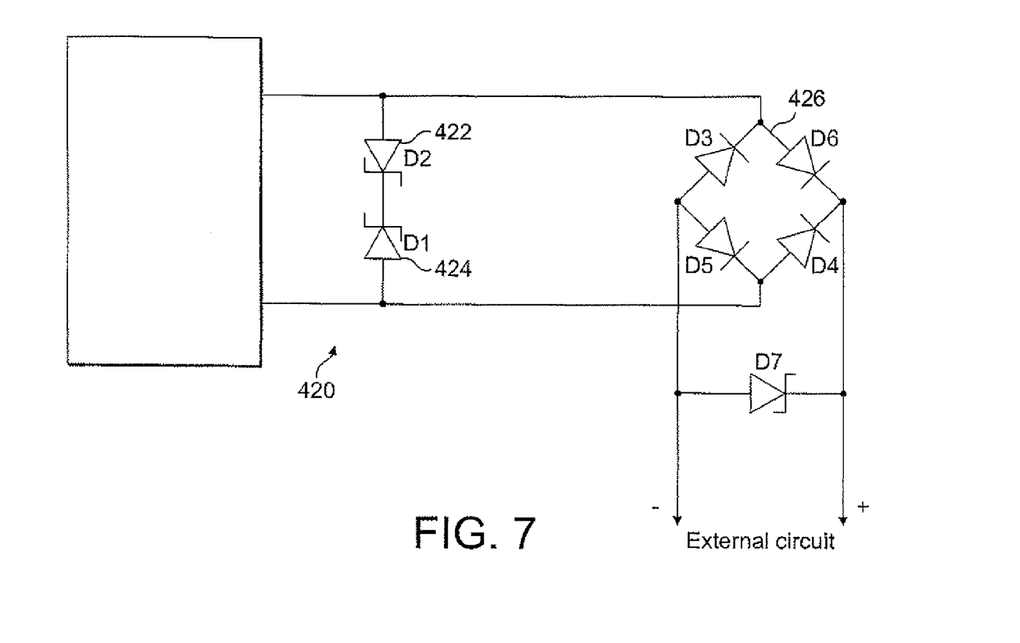
FIG. 7 is a schematic diagram of an electromechanical generator in accordance with a fifth embodiment of the present invention.

A fifth embodiment of an electromechanical generator 420 in accordance with the present invention is shown in FIG. 7. This is a modification of the embodiment of FIG. 6, additionally incorporating opposed voltage regulators, in the form of Zener diodes 422, 424 on the AC side of the rectifier 426.

Figure 8:
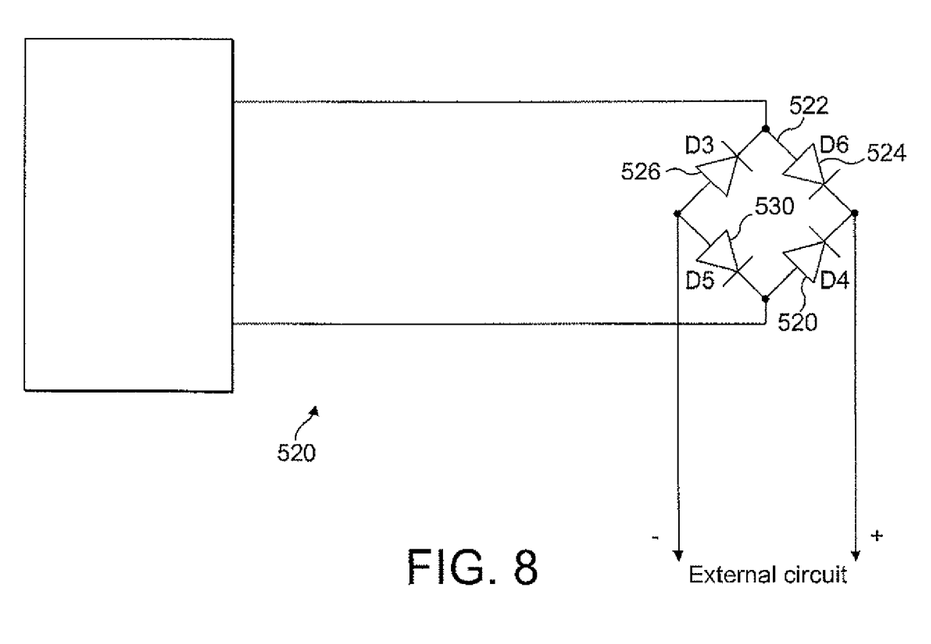
FIG. 8 is a schematic diagram of an electromechanical generator in accordance with a sixth embodiment of the present invention.

A sixth embodiment of an electromechanical generator 520 in accordance with the present invention is shown in FIG. 8. This is a modification of the embodiment of FIG. 5, in which the rectifier 522 itself incorporates voltage regulators in the form of Zener diodes 524, 526, 528, 530. The Zener diodes are used for bridge rectification and also provide the "short-circuit-above-threshold" behavior described with respect to the other embodiments of FIGS. 4, 6 and 7.

The embodiments of FIGS. 6 and 7 both produce the same output when all of the Zener diodes have the same Zener voltage. The embodiment of FIG. 8 requires Zener diodes with half of the Zener voltage than those of the embodiment of FIGS. 6 and 7, for the same output. The outputs of the embodiments represented by FIGS. 6 through 8 are then the same and are represented by FIG. 4.

A further benefit of this method of amplitude reduction using voltage regulators is the limiting of the output voltage. In environments where there is potential explosion risk due to fine powders or combustible gases, output voltages and currents must be strictly limited. All of the circuits of FIGS. 5 to 8 present a voltage output waveform that is clipped (limited) to the value of the Zener diodes used.

Other modifications and embodiments of the present invention will be apparent to those skilled in the art. For example, in the illustrated embodiment, a piezoelectric element may replace a coil/magnet combination, and the electrical output of the piezoelectric element may be detected as described herein.

What is claimed is:

1. An electromechanical generator comprising an electromechanical device for converting mechanical vibrational energy into electrical energy, the electromechanical device having a vibratable mass adapted to resonate with an oscillation amplitude at a frequency and a regulator for regulating the oscillation amplitude to a value not greater than a maximum threshold.

2. An electromechanical generator according to claim 1 wherein the regulator comprises at least one voltage regulator for an output voltage of the electromechanical device, the at least one voltage regulator being adapted to cause short circuiting of an output of the electromechanical device when the output voltage exceeds a threshold voltage.

3. An electromechanical generator according to claim 2 wherein the voltage regulator comprising at least one Zener diode.

4. An electromechanical generator according to claim 2 wherein the regulator comprises two voltage regulators connected across an alternating current electrical output of the electromechanical device, the two voltage regulators each having a predetermined breakdown voltage and being connected in series and in an opposite current configuration across the electrical output.

5. An electromechanical generator according to claim 2 wherein the regulator comprises a voltage regulator connected across a direct current electrical output of the electromechanical device, the voltage regulator having a predetermined breakdown voltage.

6. An electromechanical generator according to claim 2 wherein the regulator comprises two first voltage regulators connected across an alternating current electrical output of the electromechanical device, the two voltage regulators each having a predetermined breakdown voltage and being connected in series and in an opposite current configuration across the electrical output, a rectifier connected to the voltage regulators, and a second voltage regulator connected across a direct current electrical output of the rectifier, the second voltage regulator having a predetermined breakdown voltage.

7. An electromechanical generator according to claim 2 wherein the regulator comprises a rectifier connected across an alternating current electrical output of the electromechanical device, the rectifier incorporating a plurality of voltage regulators each having a predetermined breakdown voltage.

8. An electromechanical generator according to claim 1 further comprising a detector for detecting the oscillation amplitude, and a comparator for determining whether the detected oscillation amplitude is above a predetermined maximum threshold, and wherein the regulator is operable in response to the comparator.

9. An electromechanical generator according to claim 8 wherein the detector is adapted to detect an electrical output from the electromechanical device, and the comparator is adapted to compare the detected electrical output to a threshold value of electrical output corresponding to the predetermined maximum amplitude.

10. An electromechanical generator according to claim 9 wherein the detector is adapted to detect an alternating current and an alternating voltage outputted from the electromechanical device.

11. An electromechanical generator according to claim 10 wherein the comparator is adapted to calculate a value of the electromotive force generated by the electromechanical device, and to compare that value with a preset value of electromotive force.

12. An electromechanical generator according to claim 9 further comprising a rectifier for rectifying the electrical output of the electromechanical device, and wherein the detector is adapted to detect a direct current and a direct voltage outputted from the rectifier.

13. An electromechanical generator according to claim 9 further comprising a shunt impedance element, having variable impedance, connected across output terminals of the electromechanical device and wherein the regulator is adapted to adjust the impedance of the shunt impedance element thereby to regulate the oscillation amplitude.

14. An electromechanical generator according to claim 13 wherein the impedance of the shunt impedance element is relatively high when the oscillation amplitude is not greater than the predetermined maximum threshold, and the impedance of the shunt impedance element is relatively low when the oscillation amplitude is above the predetermined maximum threshold.

15. An electromechanical generator according to claim 8 wherein the detector is selected from one of an optical proximity device; a magnetic proximity device; a mechanical proximity device; a piezoelectric device; an electromagnetic induction device; or a magnetostrictive device.

16. An electromechanical generator according to claim 8 wherein the regulator is adapted to provided a dynamic feedback control of the amplitude in response to the detected amplitude.

17. An electromechanical generator according to claim 16 wherein the dynamic feedback control is continuous or intermittent.

* * * * *